UNITED STATES PATENT OFFICE.

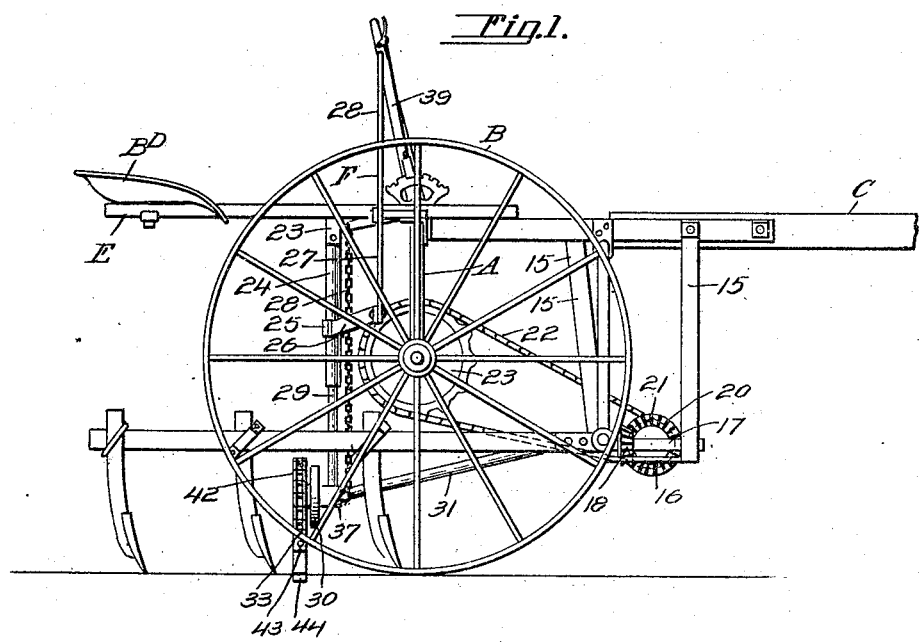
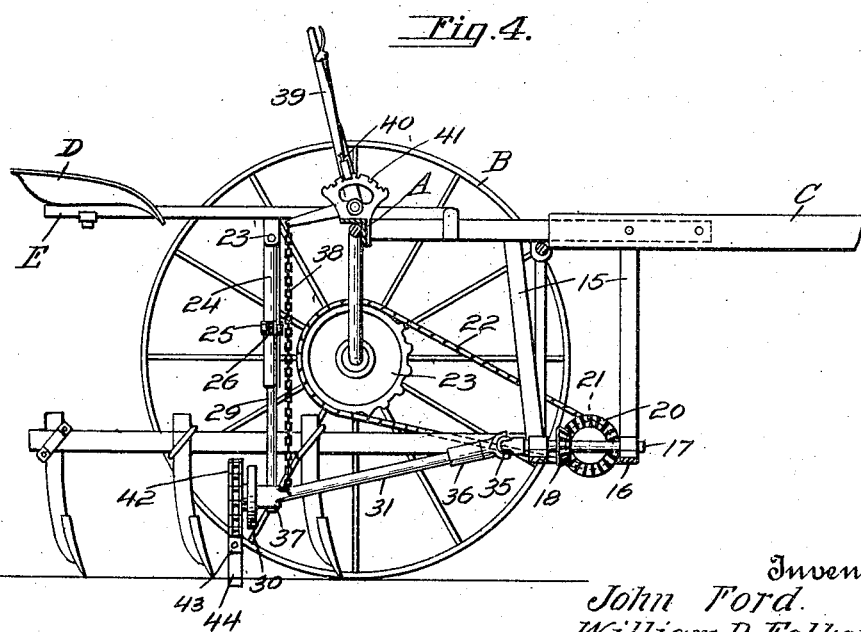

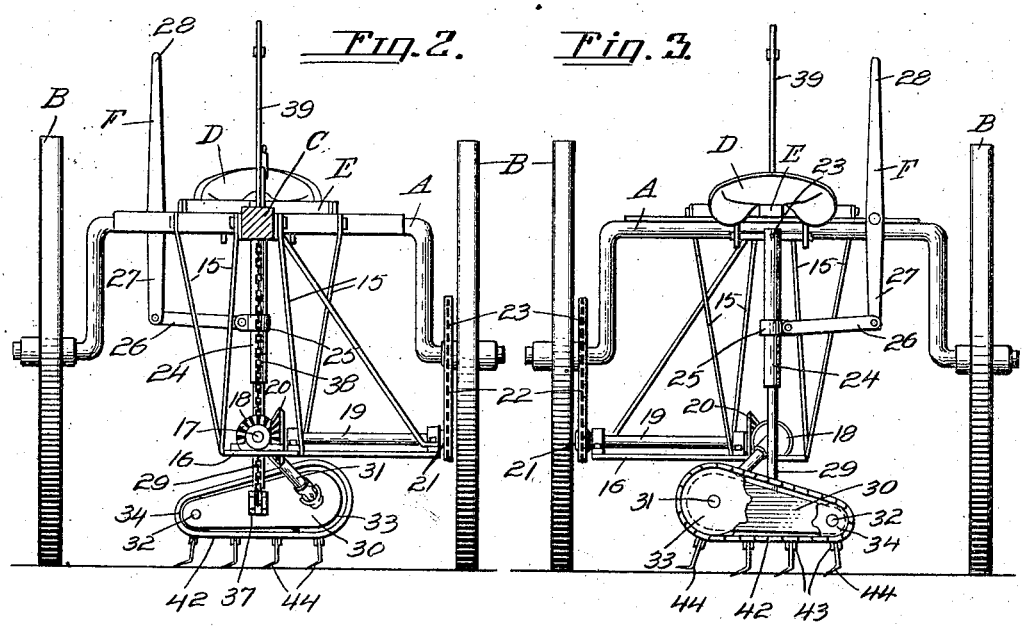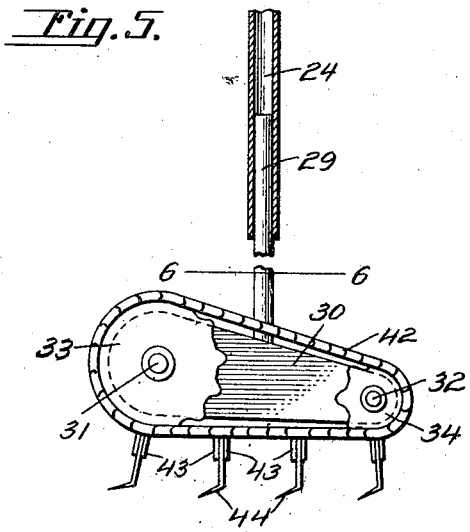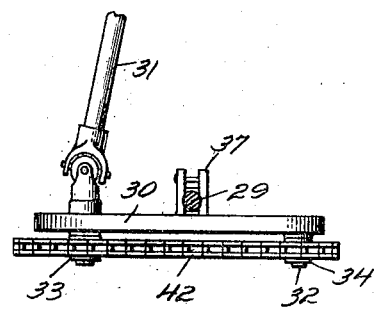

WILLIAM R. FELKER, OF ROGERS, ARKANSAS, AND JOHN FORD, OF SPRINGFIELD, TENNESSEE.

COTTON-CHOPPER.

1,254,999.

Specification of Letters Patent.

Patented Jan. 29, 1918.

Application filed September 11, 1917. Serial No. 190,860.

*To all whom it may concern:*

Be it known that we, WILLIAM R. FELKER and JOHN FORD, citizens of the United States, residing at Rogers and Springfield, in the counties of Benton and Robertson and States of Arkansas and Tennessee, have invented new and useful Improvements in Cotton-Choppers, of which the following is a specification.

This invention relates to cotton choppers and it has for its object to produce a cotton chopper of simple and improved construction which may be readily applied to and used in connection with an ordinary cultivator so that the operation of chopping out the cotton may be performed simultaneously with the first cultivation of the plants and with no expense for additional labor.

A further object of the invention is to produce a simple and improved cotton chopper mounted on a cultivator in connection with simple and improved means whereby the cotton chopping element may be raised to a convenient position for transportation and lowered so as to operate at any desired depth, and whereby said chopping element may also be adjusted laterally according to any inequalities in the row of plants.

A further object of the invention is to produce a chopping device of simple and improved construction whereby the straight horizontal cut across the row may be made in place of the arcuate cut made by chopping devices of ordinary construction.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing:—

Figure 1 is a side elevation of the improved cotton chopper showing also the cultivator to which it has been applied.

Fig. 2 is a front elevation.

Fig. 3 is a rear elevation.

Fig. 4 is a longitudinal sectional view.

Fig. 5 is a sectional detail view of the chopping element.

Fig. 6 is a sectional detail view taken on the line 6—6 in Fig. 5.

Corresponding parts in the several figures are denoted by like characters of reference.

The improved cotton chopping device may be attached to and used in connection with a cultivator of any suitable and well known construction, the same having been diagrammatically indicated in the drawings, said cultivator including the arched axle A, the ground wheels B, the tongue, a portion of which is seen at C and a seat D supported on the seat bars E.

Suitably connected with the cultivator frame and extending downwardly with respect thereto, are corner posts 15 supporting a horizontal frame 16 on which bearings are provided for a longitudinal shaft 17 having a beveled gear 18. The frame 16 is also provided with bearings for a transverse shaft 19 having a larger beveled gear 20 meshing with the beveled gear 18, said shaft 19 carrying also a sprocket wheel 21 which is connected by a chain 22 with a sprocket wheel 23 carried by one of the cultivator wheels B. Connected by a suitable hinge connection 23 with the cultivator frame is a downwardly extending substantially vertical tubular member 24 which is adapted for rocking movement in a substantially vertical plane transversely of the cultivator, said tubular member having a sleeve or collar 25 which is connected by a link 26 with the downwardly extending arm 27 of a lever F, the upwardly extending arm of which 28, constitutes a handle which is conveniently accessible to the operator occupying the seat D. Telescoping in the tubular member 24 is a rod 29 carrying at its lower end a supporting member or block 30 which constitutes a support for the chopping element; said member or block, which is positioned transversely with respect to the cultivator, is provided with bearings for two shafts 31, 32 each carrying a sprocket wheel 33, 34; the shaft 31 extends forwardly with respect to the cultivator and is connected by a universal joint 35 with the driven shaft 17. A telescopic shaft may also be provided as indicated at 36 to compensate for the varying distance between the block or supporting member 30 and the driven shaft 17. The block or supporting member 30 has a lug 37 which is connected by means of a flexible connection 38 with one arm of a bell crank lever 39, the other arm of which constitutes a handle whereby the block or supporting member 30 may be raised or lowered, such movement being permissible owing to the fact that the rod 29 will telescope in the tubular member 24. The handle member of the bell crank lever 39 is equipped with a stop member 40 engaging a rack segment 41 whereby the lever 39 and the parts actuated thereby may be securely retained in adjusted position.

Trained over the sprocket wheels 33, 34 is an endless chain 42, on some of the links of which, at proper intervals, shanks 43 are secured, said shanks having blades or chopping members 44 connected therewith. The sprocket wheels 33, 34 may be of different sizes, as shown, but the lower lead of the chain should be supported, when the device is in operation, in an approximately horizontal position, so that the blades will make a straight cut across the row of plants that is being operated upon. The blade carrying shanks may be secured on the chain, arranged and spaced in any desired manner that will be productive of the best results.

It will be seen that by the construction herein shown and described, by manipulating the lever 39, the rod 29 may be telescoped in the tubular member 24, thereby raising the chopping device from the ground to a convenient position for transportation. By lowering the chopping device to any desired extent the blades 44 may be made to engage the ground at any desired depth for the purpose of chopping out the plants. The operator, by means of the controlling lever F, will be enabled to move the chopping device transversely of the cultivator when the machine is in operation, thereby enabling him to follow any irregularities in the row. The improved chopping device is simple in construction and it may be readily applied to almost any well known type of cultivator.

We claim:—

1. A cotton chopping device comprising a driven longitudinal shaft, a swingingly supported tubular member, a rod telescoping in the tubular member, a supporting member carried by the rod, a movable chopping device guided on the supporting member, and means for transmitting motion to the chopping device from the driven longitudinal shaft.

2. A cotton chopping device comprising a driven longitudinal shaft, a swingingly supported tubular member, a rod telescoping in the tubular member, a supporting member carried by the rod, a movable chopping device guided on the supporting member, and means for transmitting motion to the chopping device from the driven longitudinal shaft, said transmission means including a universal joint and a telescoping shaft.

3. A cotton chopping device comprising a driven longitudinal shaft, a swingingly supported tubular member, a rod telescoping in the tubular member, a supporting member carried by the rod, means for adjusting the rod to effect vertical adjustment of the supporting member, sprocket carrying shafts journaled in the supporting member, a connection between one of said shafts and the longitudinal driven shaft, said connection including a universal joint, a chain trained over the sprockets, shanks connected with links of the chain at suitable intervals and chopping blades carried by the shanks.

4. In a cotton chopping device, a driven longitudinal shaft, a swingingly supported tubular member, a lever controlling the swinging movement of said member, a rod telescoping in the tubular member, a supporting member carried by the rod, sprocket carrying shafts journaled in the supporting member, means for transmitting motion to one of said shafts from the longitudinal driven shaft, an endless chopping element guided over the sprockets, an adjusting lever, and a flexible connection between said lever and the supporting member to permit vertical adjustment of the latter.

In testimony whereof we affix our signatures.

WILLIAM R. FELKER.
JOHN FORD.

Copies of this patent may be obtained for five cents each, by addressing the "Commissioner of Patents, Washington, D. C."